(12) United States Patent
Kuan et al.

(10) Patent No.: US 9,800,162 B2
(45) Date of Patent: Oct. 24, 2017

(54) POWER CONTROL SYSTEM AND METHOD THEREOF

(71) Applicant: JOINT POWER EXPONENT, LTD., Hsinchu (TW)

(72) Inventors: Yuan Kuan, Hsinchu (TW); Jyh-Ting Lai, Hsinchu (TW)

(73) Assignee: Joint Power Exponent, Ltd., Hsinchu (TW)

( * ) Notice: Subject to any disclaimer, the term of this patent is extended or adjusted under 35 U.S.C. 154(b) by 0 days.

(21) Appl. No.: 15/345,127

(22) Filed: Nov. 7, 2016

(65) Prior Publication Data

US 2017/0141686 A1  May 18, 2017

(30) Foreign Application Priority Data

Nov. 13, 2015  (TW) .............................. 104137518 A

(51) Int. Cl.
 *H02M 3/33* (2006.01)
 *H02M 3/335* (2006.01)
 *H02M 1/08* (2006.01)

(52) U.S. Cl.
 CPC ....... *H02M 3/33507* (2013.01); *H02M 1/083* (2013.01)

(58) Field of Classification Search
 CPC ......... H02M 3/33507; H02M 3/33515; H02M 3/33523; H02M 2001/0009; Y02B 70/1433
 USPC ................... 363/21.12, 21.16, 21.18, 41, 95; 323/222, 237, 240, 271–275, 282–288
 See application file for complete search history.

(56) References Cited

U.S. PATENT DOCUMENTS

| 4,174,496 A | * | 11/1979 | McFall | .................... G05F 1/455 323/235 |
| 5,497,311 A | * | 3/1996 | Hanawaka | ........ H02M 3/33507 363/21.03 |
| 2014/0132179 A1 | * | 5/2014 | McAuliffe | ............ H02M 3/156 315/291 |

FOREIGN PATENT DOCUMENTS

| CN | 103312176 | 9/2013 |
| TW | 201528669 | 7/2015 |

* cited by examiner

*Primary Examiner* — Rajnikant Patel
(74) *Attorney, Agent, or Firm* — Muncy, Geissler, Olds & Lowe, P.C.

(57) ABSTRACT

A power control system is electrically connected to a power function circuit including a power circuit, a coil module, a switch, and a load circuit, and includes at least one timer, a zero-current trigger unit, a status control unit, and a driver unit. The status control unit has a first status interval, a second status interval, a third status interval and a fourth status. The power control method triggers the status control unit to change the status interval when a counting time reaches one specific time interval corresponding one status interval. When a coil voltage of the coil module drops to zero from a voltage larger than a positive threshold voltage in the third status interval or the fourth status interval, the status control unit triggers to change the status interval, re-enters the first status interval, resets the timer, and triggers the driver unit to open the switch.

7 Claims, 9 Drawing Sheets

POWER CONTROL SYSTEM AND METHOD THEREOF

This application claims the benefit of Taiwan Patent Application Serial No. 104137518, filed Nov. 13, 2015, the subject matter of which is incorporated herein by reference.

BACKGROUND OF INVENTION

1. Field of the Invention

The invention relates to a power control system and a power control method, and more particularly to the power control system and the power control method that can be applicable to various operation modes.

2. Description of the Prior Art

Currently, typical portable electronic devices such as notebook computers, tablet computers, personal digital assistants, video games, video cameras and so on, can transform a DC (direct current) signal of a voltage level to a DC signal of another voltage level (a DC/DC transformer for example), an AC (alternate current) signal to a DC signal (an AC/DC transformer), a DC signal to an AC signal (a DC/AC transformer for example), or an AC signal to another AC signal (an AC/AC transformer for example). The classification of the forgoing transformers of the AC or DC power control system is based on the current status of the induction-storage elements. If a switch element is controlled to reach a conduction status prior to a zero-current point, then the operation of the power system is defined as a continuous conduction mode (CCM). If the switch element is controlled to reach the conduction status right at the zero-current point, then the operation of the power system is defined as a boundary (or critical) conduction mode (BCM/CrM). If the switch element is controlled to reach the conduction status after a delay time posterior to the zero-current point, then the operation of the power system is defined as a non-continuous conduction mode (DCM).

However, none of the current power control systems can fulfill all of the aforesaid operation modes, and thus the instant power control system cannot be switched to a proper operation mode in correspondence to the load status. Thereupon, various disadvantages to the power control system would be inevitable, such as a high input peak current, high frequency switch loss, entrance of the low-frequency intermittent burst mode, bias in current waveform, occurrence of audio noise while in entering an audio frequency and so on. Hence, any improvement upon the conventional power control system is definitely welcome to the art.

SUMMARY OF THE INVENTION

In view of the prior art of the power control system can't be switched to a relevant operation mode with respect to a particular load status, thus, accordingly, it is the primary object of the present invention to provide a power control system and a power control method that include a status control unit to divide the status of the switch into four status intervals, by which the object of fulfilling different operation modes can be achieved.

In the present invention, the power control system is electrically connected to a power function circuit further having a power circuit, a coil module, a switch and a load circuit. The coil module is electrically connected to the power circuit, the switch is electrically connected to the coil module, the load circuit is electrically connected to the coil module, and the power circuit is to provide a supply voltage for having a detection coil of the coil module to generate an auxiliary winding voltage. The power control system includes at least one timer, a zero-current trigger unit, a status control unit and a driver unit. The at least one timer is to count a first counting time, a second counting time, a third counting time and a fourth counting time. The zero-current trigger unit, electrically connected to the coil module, is to transmit a zero-current trigger signal upon when the auxiliary winding voltage drops to zero from a voltage larger than a positive detected threshold voltage. The status control unit, electrically connected to the timer and the zero-current trigger unit, has a first status interval, a second status interval, a third status interval and a fourth status interval. The first status interval is corresponding to a first time interval, the second status interval is corresponding to a second time interval, the third status interval is corresponding to a third time interval, and the fourth status interval is corresponding to a fourth time interval. An switching-on interval of the switch is defined to the first status interval, while a switching-off interval of the switch is divided to define the second status interval, the third status interval and the fourth status interval. The driver unit is electrically connected to the status control unit and the switch.

In the present invention, initially when the status control unit enters the first status interval, the timer begins to count the first counting time; when the first counting time reaches the first time interval, the status control unit enters the second status interval, and the timer counts the second counting time; when the second counting time reaches the second time interval, the status control unit enters the third status interval, and the timer counts the third counting time; when the third counting time reaches the third time interval, the status control unit enters the fourth status interval, and the timer counts the fourth counting time; and, when the fourth counting time reaches the fourth time interval, the status control unit re-enters the first status interval and triggers the timer to recount. Further, when the status control unit in one of the third status interval and the fourth status interval receives the zero-current trigger signal, the first status interval is re-entered, the timer is triggered to recount, and the driver unit is triggered to open the switch.

In one embodiment of the present invention, the power control system further includes an arithmetic unit electrically connected to the load circuit and the status control unit. The supply voltage generates a load voltage in the load circuit, and the arithmetic unit bases on the load voltage to calculate the first time interval, the second time interval, the third time interval and the fourth time interval. In addition, the power control system further includes a zero-current recording unit electrically connected to the zero-current trigger unit and the status control unit. The zero-current recording unit records and transmits a zero-current recording signal upon when the zero-current trigger unit transmits the zero-current trigger signal. When the status control unit enters the fourth status interval and detects the zero-current recording signal, the first status interval is re-entered, the timer is triggered to recount, and the driver unit is triggered to open the switch. In addition, when the status control unit is in the second status interval, the switch is maintained to be switched off.

In another aspect of the present invention, the power control method, applicable to the aforesaid power control system, includes: a step (a) of determining whether or not the first counting time reaches the first time interval; a step (b) of, if a judgment of the step (a) is positive, the status control unit entering the second status interval; a step (c) of determining whether or not the second counting time reaches the second time interval; a step (d) of, if a judgment of the step (c) is positive, the status control unit entering the third status interval; a step (e) of determining whether or not the auxiliary winding voltage drops to zero from a voltage larger than the positive detected threshold voltage (namely, a corresponding zero-current trigger signal is generated); a step (f) of, if a judgment of the step (e) is positive, the status control unit re-entering the first status interval, triggering the timer to recount, and triggering the driver unit to open the switch; a step (g) of, if the judgment of the step (e) is negative, determining further whether or not the third counting time reaches the third time interval; a step (h) of, if a judgment of the step (g) is positive, the status control unit entering the fourth status interval; a step (i) of determining whether or not the auxiliary winding voltage drops to zero from the voltage larger than the positive detected threshold voltage; a step (j) of, if a judgment of the step (i) is positive, the status control unit re-entering the first status interval, triggering the timer to recount, and triggering the driver unit to open the switch; a step (k) of, if the judgment of the step (i) is negative, determining further whether or not the fourth counting time reaches the fourth time interval; and, a step (l) of, if a judgment of the step (k) is positive, the status control unit re-entering the first status interval, triggering the timer to recount, and triggering the driver unit to open the switch.

In one embodiment of the present invention, between the step (j) and the step (k), the power control method further includes a step (j0) of determining whether or not the zero-current recording signal is zero. In addition, if a judgment of the step (j0) is positive, the status control unit re-enters the first status interval, triggers the timer to recount, and triggers the driver unit to open the switch.

In one embodiment of the present invention, the supply voltage generates a load voltage in the load circuit. In addition, prior to the step (a), the power control method further includes a step (a0) of basing on the load voltage to calculate the first time interval, the second time interval, the third time interval and the fourth time interval. Also, between the step (b) and the step (c), the switch is maintained to be switched off, and the step (b) further includes a step (b0) of determining whether or not the auxiliary winding voltage is zero (i.e. the zero-current trigger signal is active). If the judgment is positive, a zero-current occurrence event is recorded and a zero-current recording signal is transmitted.

By providing the power control system and the power control method of the present invention, since the four status intervals are introduced so as to have the system and the method applicable to various operation modes, thus the preferred operation mode can be determined and selected according to the practical load status. Thereupon, the conventional shortcomings in the high input peak current, the high frequency switch loss, the entrance of the low-frequency intermittent burst mode, the bias in current waveform, the occurrence of audio noise while in entering an audio frequency and so on, can be effectively resolved.

All these objects are achieved by the power control system and the method thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a power control system and a method thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
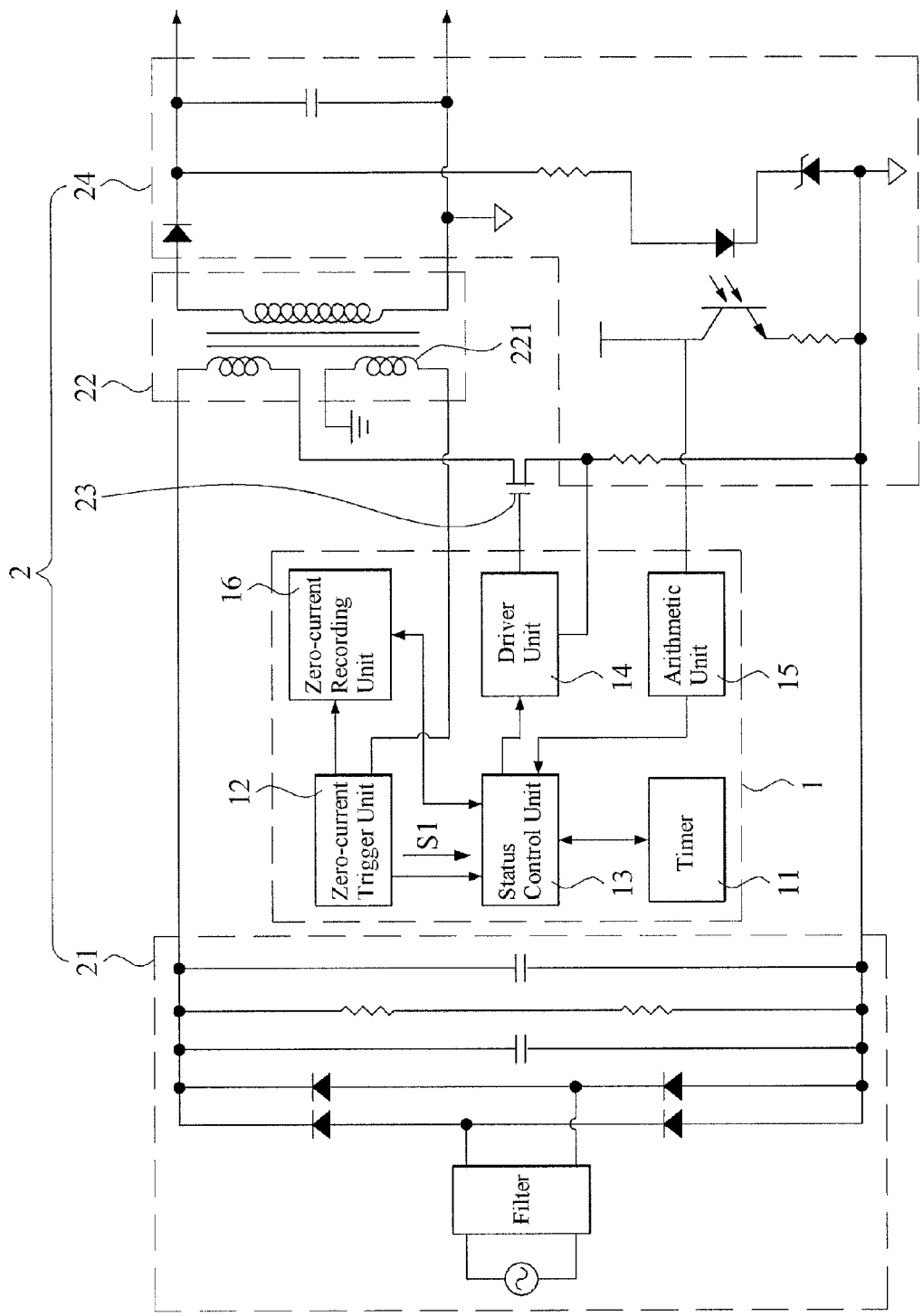
FIG. 1 is a schematic view showing electrical connection of a preferred power control system in accordance with the present invention and a first power function circuit.
Figure 2:
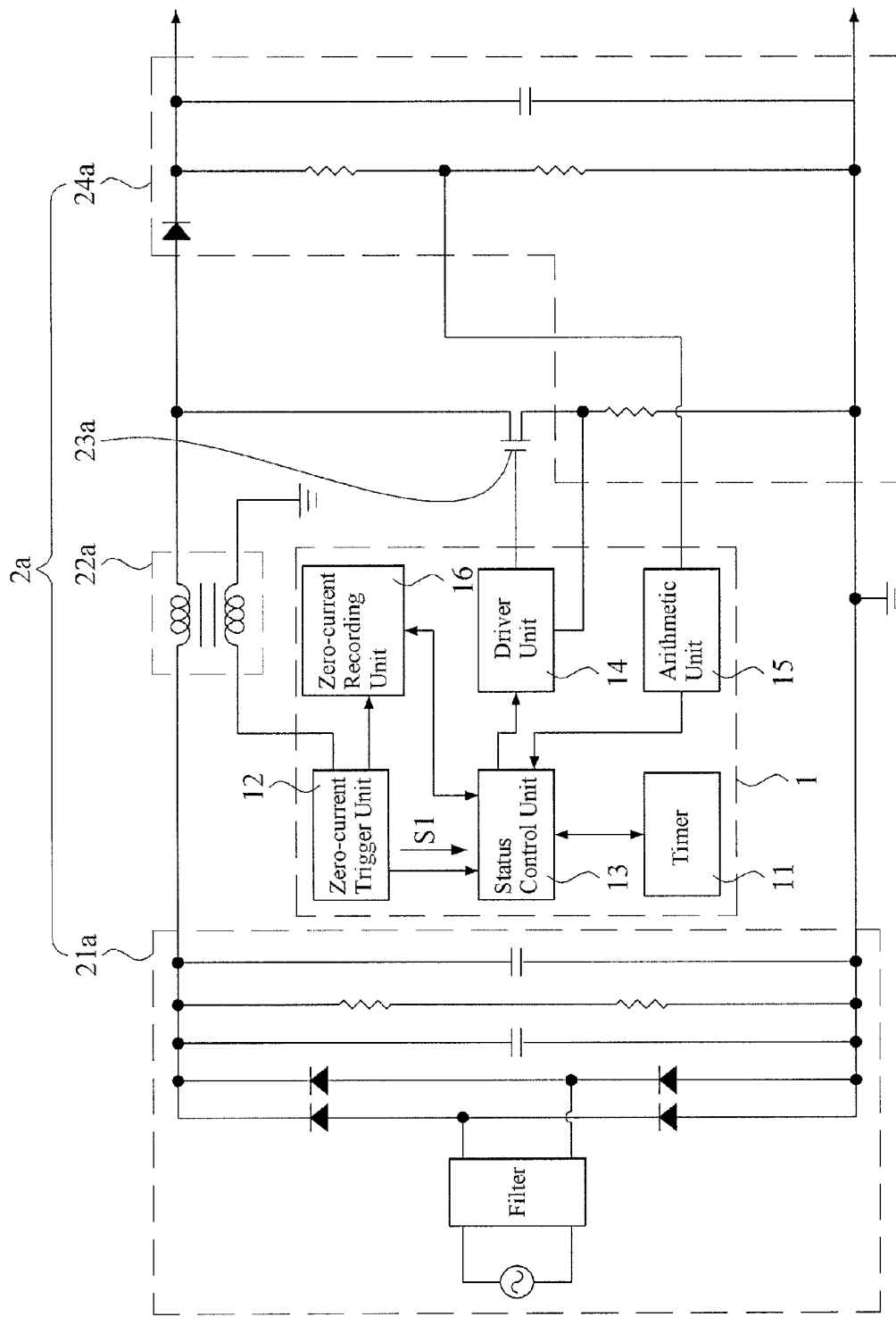
FIG. 2 is a schematic view showing electrical connection of the preferred power control system of FIG. 1 and a second power function circuit.

Refer now to FIG. 1 and FIG. 2; where FIG. 1 is a schematic view showing electrical connection of a preferred power control system in accordance with the present invention and a first power function circuit, and FIG. 2 is a schematic view showing electrical connection of the preferred power control system of FIG. 1 and a second power function circuit.

As shown, the preferred power control system 1 of the present invention is electrically connected to a first power function circuit 2 and a second power function circuit 2a, respectively, in FIG. 1 and FIG. 2. The power function circuit 2/2a includes individually a power circuit 21/21a, a coil module 22/22a, a switch 23/23a and a load circuit 24/24a. The coil module 22/22a is electrically connected to the power circuit 21/21a. The switch 23/23a is electrically connected to the coil module 22/22a. The load circuit 24/24a is electrically connected to the coil module 22/22a. It shall be noted that the first power function circuit 2 of FIG. 1 is (but not limited to) a topology of a flyback circuit, while the second power function circuit 2a is (but not limited to) a topology of a boost power factor correction (PFC) circuit. The combination of the power circuit 21/21a, the coil module 22/22a, the switch 23/23a and the load circuit 24/24a is determined simply per practical requirements. For concise explanations of the present invention, the first power function circuit 2 (i.e. FIG. 1) would be adopted as the typical embodiment for the following descriptions.

The power control system 1 includes at least one timer 11, a zero-current trigger unit 12, a status control unit 13, a driver unit 14, an arithmetic unit 15 and a zero-current recording unit 16. Though only one timer 11 is shown in the preferred embodiment of FIG. 1, yet the other embodiment may includes more than one timer 11. However, since the timer 11 is already mature in the art, and thus details thereabout would be omitted herein.

The zero-current trigger unit 12 is electrically connected to a detection coil 221 of the coil module 22. The status control unit 13 is electrically connected to the zero-current trigger unit 12 and the timer 11. Particularly, the status control unit 13 includes a first status interval (ON interval), a second status interval (OFF interval), a third status interval (Soft-window interval, i.e. SW interval) and a fourth status interval (Hard-window interval, i.e. HW interval). The first status interval is respective to a first time interval, the second status interval is respective to a second time interval, the third status interval is respective to a third time interval, and the fourth status interval is respective to a fourth time interval. Any of the aforesaid four time intervals is an interval of time. An switching-on interval (also called as a conduction interval) of the switch 23 is defined to the first status interval, while a switching-off interval of the switch 23 is divided to define the second status interval, the third status interval and the fourth status interval. Namely, while the switch 23 is opened, it is in the first status interval; and, while the switch 23 is switched off, it is in the second status interval, the third status interval or the fourth status interval. Details would be followed lately.

The driver unit 14 is electrically connected to the status control unit 13. The arithmetic unit 15 is electrically connected to the load circuit 24 and the status control unit 13. The zero-current recording unit 16 is electrically connected to the zero-current trigger unit 12 and the status control unit 13. In the present invention, each of the zero-current trigger unit 12, the status control unit 13, the driver unit 14, the arithmetic unit 15 and the zero-current recording unit 16 can be embodied as an analog circuit or a digital circuit. For example, the zero-current trigger unit 12 and the zero-current recording unit 16 can be embodied as, but not limited to, a combination of a gate and an SR latch.

In the preset invention, the power circuit 21 can provide a supply voltage generally processed by wave filtration and bridge rectification. While the supply voltage is transmitted to the coil module 22, an auxiliary winding voltage ($V_{ZCD}$) is generated in a detection coil 221 of the coil module 22. Generally, the detection coil 221 is a secondary coil for sensing a current of a first coil. Details about the auxiliary winding voltage would be elucidated lately. In addition, while the supply voltage is transmitted to the load circuit 24, a load voltage would be generated in the load circuit 24. In the present invention, the load voltage can be, but not limited to, a voltage across a resistor or an optical coupler.

The timer 11 is to count a first counting time t1, a second counting time t2, a third counting time t3 and a fourth counting time t4. Practically, the timer 11 counts in an order of the first counting time t1, the second counting time t2, the third counting time t3 and, finally, the fourth counting time t4. Namely, as soon as the first counting time t1 has been counted, then the second counting time t2 begins to count, etc.

The zero-current trigger unit 12 is to transmit a zero-current trigger signal S1 upon when the auxiliary winding voltage $V_{ZCD}$ is dropped to zero from a positive detected threshold voltage Vzcd_th. It shall be noted that, when the switch 23 is switched off, the detection coil 221 would generate the aforesaid auxiliary winding voltage $V_{ZCD}$. Also, the detected threshold voltage, generally a positive voltage, is the lowest detection capability of the circuit with respect to the voltage (as shown from FIG. 4 to FIG. 6). The auxiliary winding voltage $V_{ZCD}$ would experience an oscillating interval (also called as an oscillation frequency), and then decay to zero.

Figure 3:
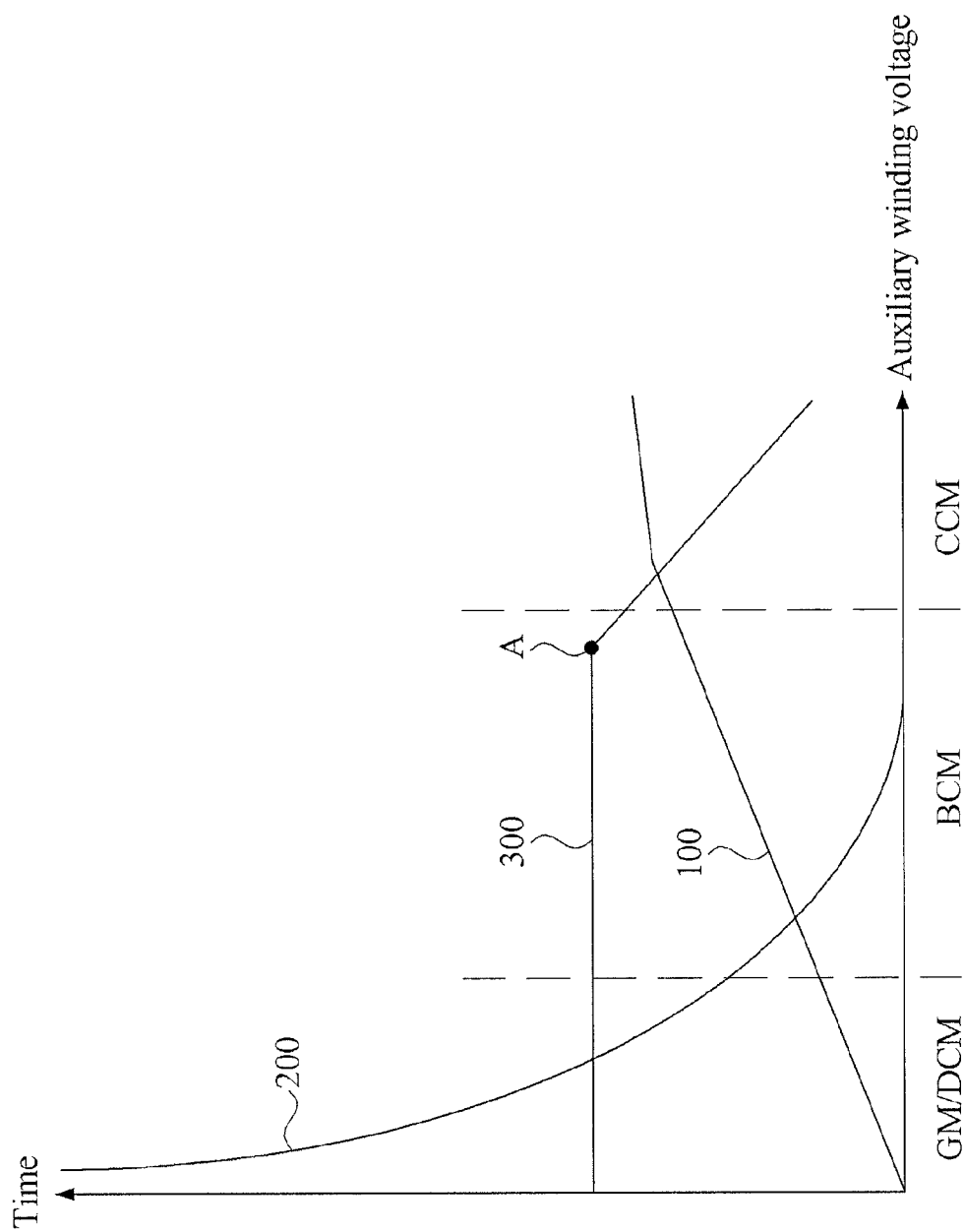
FIG. 3 is a schematic waveform plot showing the time intervals and the load voltages of the preferred power control system of FIG. 1.

The arithmetic unit 15 is to base on the load voltage of the load circuit 24 to calculate the first time interval, the second time interval, the third time interval and the fourth time interval with respect to the first status interval, the second status interval, the third status interval and the fourth status interval of the status control unit 13, respectively. Refer now to FIG. 3, where a schematic waveform plot showing the time intervals and the load voltages of the preferred power control system of FIG. 1 is illustrated. As shown, the curve 100 stands for the time value of the first time interval, the curve 200 stands for the time value of the second time interval, the curve 300 stands for the time value of the fourth time interval. In FIG. 3, the relationships of the load voltage to the first time interval, the second time interval and the fourth time interval are clearly demonstrated.

More precisely, the first time interval is proportional to the instant value of the load voltage, the second time interval is inversely proportional to the mean value of the load voltages at different timing (for example, the mean value of the output voltages at the $1^{st}$, $2^{nd}$ and $3^{rd}$ seconds), the third time interval is 1.5~2 times of the aforesaid oscillating interval, and the fourth time interval is the lowest preset operating frequency (a constant) if the mean value of the load voltages at different timing is lower than a specific preset threshold voltage (for example, the threshold voltage at A of FIG. 3). In addition, if the mean value of the load voltages at different timing is larger than the specific preset threshold voltage, the fourth time interval is inversely proportional to the mean value of the load voltages at different timing. In the present invention, the definitions for different time intervals are not limited to the aforesaid examples.

The zero-current recording unit 16 is to record and transmit a zero-current record signal (not shown in the figure) upon when the zero-current trigger unit 12 transmits the zero-current trigger signal S1, and to reset to the first status interval for another trigger upon when the status control unit 13 enters the fourth status interval and detects the existence of the zero-current record signal. The method for recording a zero-current occurrence event can be a step of assigning "1" to the digital signal for the system.

In practice, when the situation of the auxiliary winding voltage $V_{ZCD}$ dropping to zero from a voltage larger than the detected threshold voltage Vzcd_th is not considered, the initial status of the switch 23 is opened, and, if the status control unit 13 enters the first status interval, the timer 11 is synchronous to count the first counting time t1. In addition, when the first counting time t1 reaches the first time interval, the status control unit 13 would be triggered to enter the second status interval. At this time, the timer 11 would synchronously count the second counting time t2, and then the status control unit 13 would be triggered to enter the third status interval if the second counting time t2 reaches the second time interval. Thus, the timer 11 would immediately count the third counting time t3. When the third counting time t3 reaches the third time interval, the status control unit 13 would be triggered to enter the fourth status interval, and the timer 11 would synchronously count the fourth counting time t4. Further, when the fourth counting time t4 reaches the fourth time interval, the status control unit 13 would reset to enter the first status interval and trigger the timer 11 to recount. Namely, the status control unit 13 would enter the next counting of time orderly if the counting time reach the instant time interval.

On the other hand, when the possible situation of the auxiliary winding voltage $V_{ZCD}$ dropping to zero from a voltage larger than the detected threshold voltage Vzcd_th is considered, if the status control unit 13 in the second status interval receives the zero-current trigger signal S1 issued by the zero-current trigger unit 12, the switch 23 is maintained at the switching-off status. Namely, even upon receiving of the zero-current trigger signal S1, the switch 23 is not opened. In addition, when the fourth counting time t4 reaches the fourth time interval, the status control unit 13 would reset to enter the first status interval, to trigger the timer 11 to recount, and to trigger the driver unit 14 to open the switch 23.

If the status control unit 13 in any of the third status interval and the fourth status interval receives the zero-current trigger signal S1, then status control unit 13 would reset to enter the first status interval, to trigger the timer 11 to recount, and to trigger the driver unit 14 to open the switch 23. Namely, as long as the zero-current trigger signal S1 is received in either the third status interval or the fourth status interval, then the first status interval is directly entered, and the switch 23 is opened. When the fourth counting time t4 reaches the fourth time interval and the zero-current record signal is detected, the first status interval is re-entered, the timer 11 is triggered to recount, and the driver unit 14 is triggered to open the switch 23.

Figure 4:
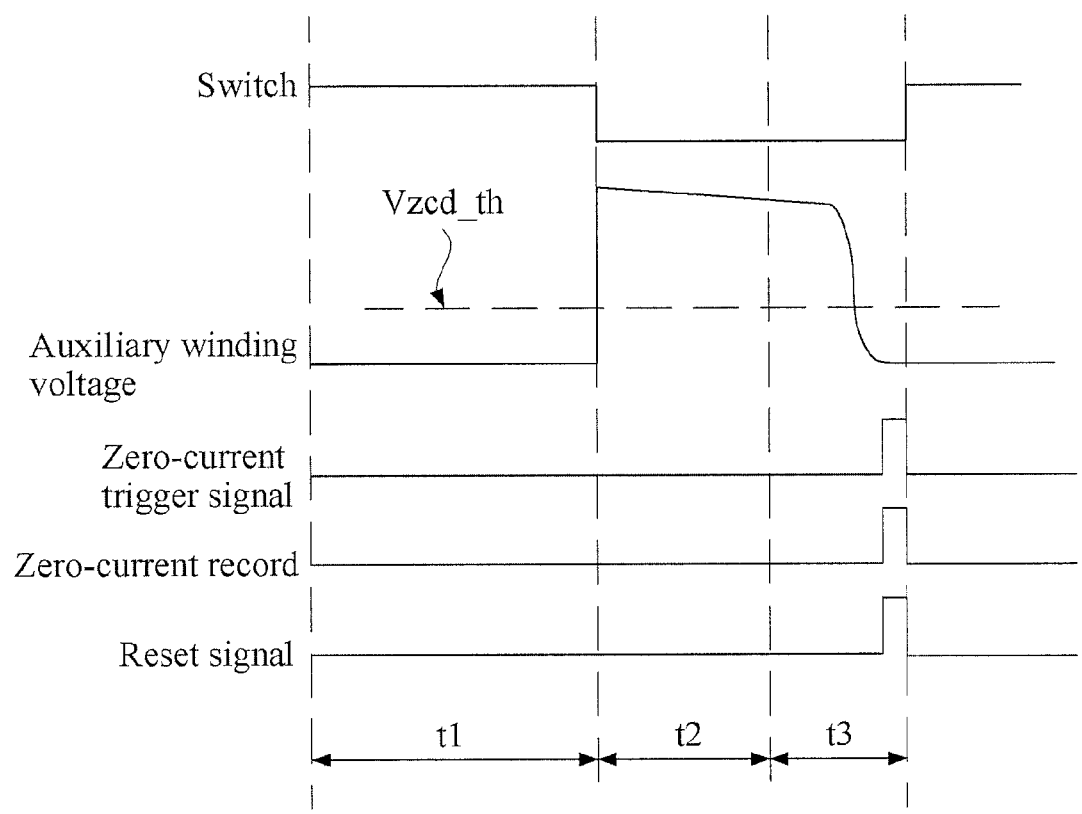
FIG. 4 is a schematic waveform plot of the preferred power control system of FIG. 1 applied to a boundary conduction mode.

In order to clearly explain the present invention to the art, following example is adopted. Referring now to FIG. 4, a schematic waveform plot of the preferred power control system of FIG. 1 applied to a boundary conduction mode is illustrated. As shown, in the initial open status of the switch 23, the timer 11 begins to count the first counting time t1. At this time, the status control unit 13 is in the first status interval. While the first counting time t1 reaches the first time interval corresponding to the first status interval, the status control unit 13 would be triggered to enter the second status interval, and the switch 23 would be switched to the switching-off status. Then, the trigger timer 11 would begin to count the second counting time t2. While the second counting time t2 reaches the second time interval corresponding to the second status interval, the status control unit 13 would be triggered to enter the third status interval. Then, the trigger timer 11 would be immediately to count the third counting time t3. In FIG. 4, while in the third status interval, as the auxiliary winding voltage approaches the end of the third status interval, the auxiliary winding voltage would drop to zero from a voltage larger than the detected threshold voltage Vzcd_th in an oscillating manner. At this time, the zero-current trigger unit 12 would be triggered to issue the zero-current trigger signal S1, the zero-current recording unit 16 would be triggered to record the zero-current occurrence event (by assigning "1" to the corresponding digital logic signal), the status control unit 13 is triggered to reset the timer 11 by assigning "1" to the corresponding digital logic signal), and the driver unit 14 is triggered to open the switch 23 and to re-enter the first status interval. It shall be noted that, in the boundary conduction mode, the fourth time interval corresponding to the fourth status interval is far smaller than the other time intervals and thus omitted in the figure. In other embodiments, the definition of the fourth time interval corresponding to the fourth status interval can be the sum of the first time interval through the third time interval. Namely, the fourth time interval defined for the fourth status interval can be an interval following the third time interval, or a sum of the first time interval through the third time interval.

Figure 5:
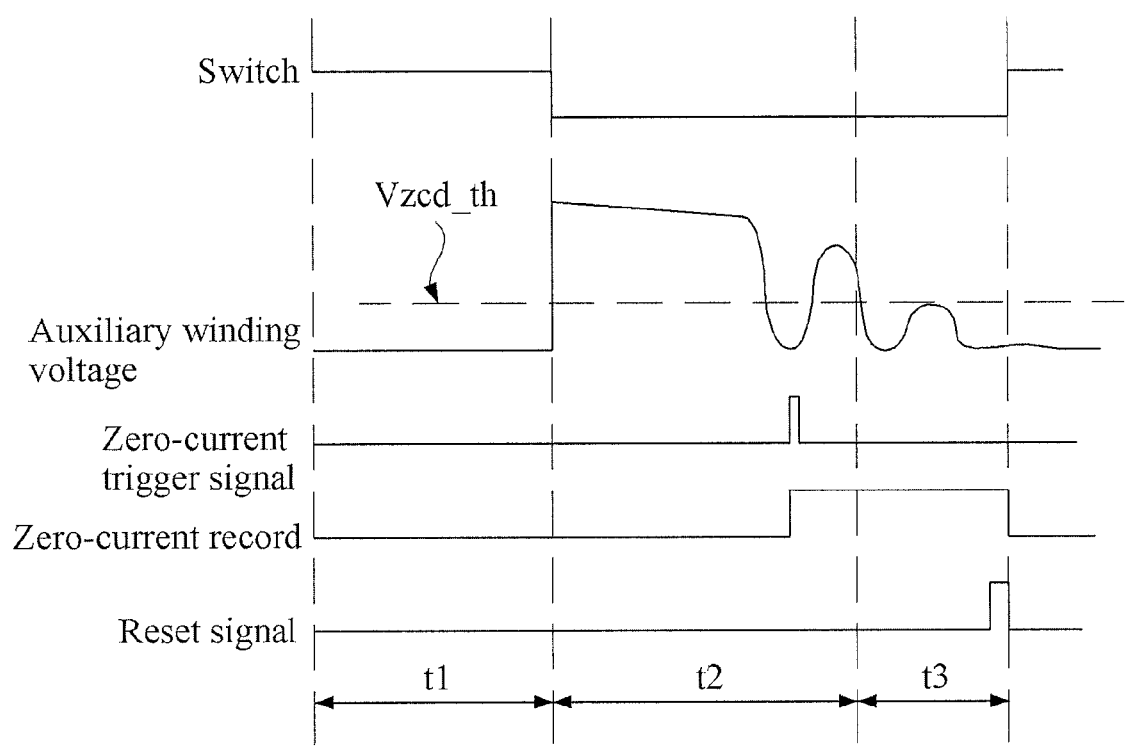
FIG. 5 is a schematic waveform plot of the preferred power control system of FIG. 1 applied to a non-continuous conduction mode.

Referring now to FIG. 5, a schematic waveform plot of the preferred power control system of FIG. 1 applied to a non-continuous conduction mode is illustrated. As shown, the first status interval of FIG. 5 is resembled to that of FIG. 4, and thus details thereabout are omitted herein. In the second status interval, the auxiliary winding voltage drops to zero from a voltage larger than the detected threshold voltage Vzcd_th in an oscillating manner. However, at this interval, the switch is maintained at the switching-off status. Till the second counting time t2 reaches the second time interval corresponding to the second status interval, the status control unit 13 would be triggered to enter the third status interval, and the timer 11 is triggered to begin the counting of the third counting time t3. As shown, when the third status interval ends (the fourth status interval is neglected as explained above), and though the auxiliary winding voltage does not drop to zero from a voltage larger than the detected threshold voltage Vzcd_th, yet, at this time, the status control unit 13 would keep detecting the existence of the zero-current record signal, the first status interval is re-entered, the timer 11 is triggered to recount, and the driver unit 14 is triggered to open the switch 23.

Figure 6:
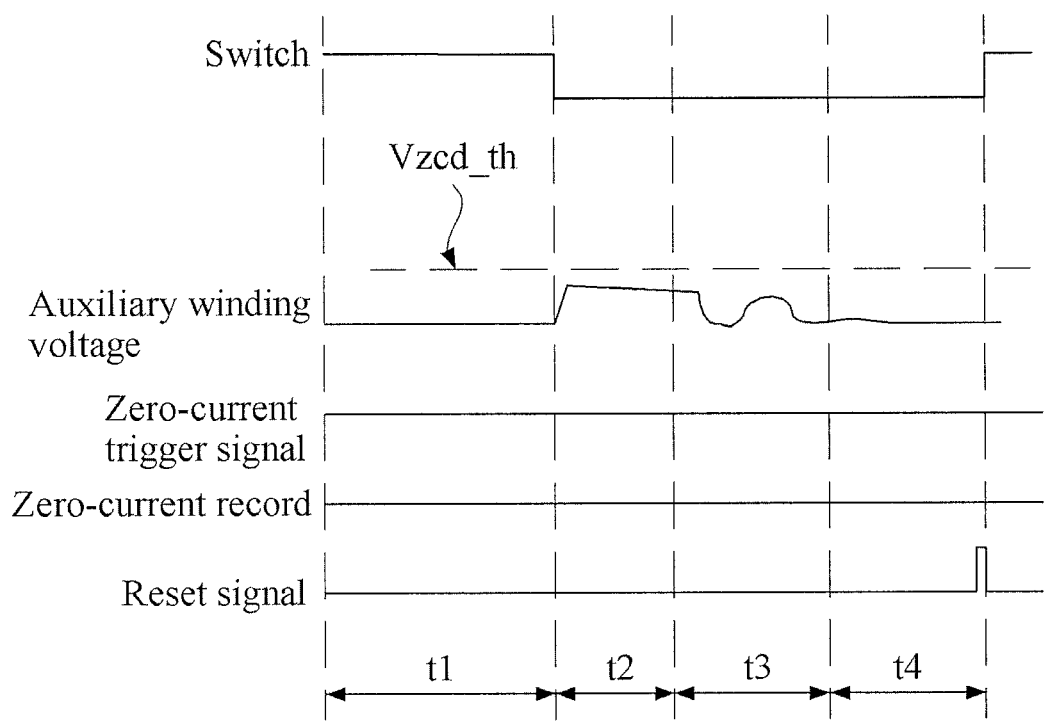
FIG. 6 is a schematic waveform plot of the preferred power control system of FIG. 1 applied to a light-duty fixed-frequency mode.

Referring now to FIG. 6, a schematic waveform plot of the preferred power control system of FIG. 1 applied to a light-duty fixed-frequency mode is illustrated. As shown, in the light-duty fixed-frequency mode (GM), if the situation of dropping the auxiliary winding voltage to zero from a voltage larger than the detected threshold voltage Vzcd_th is not detected in either the second status interval or the third status interval so that the fourth counting time t4 is the same as the fourth time interval corresponding to the fourth status interval, then the status control unit 13 is directly triggered to reset the timer 11, and the driver unit 14 is triggered to open the switch 23 so as to re-enter the first status interval.

Figure 7:
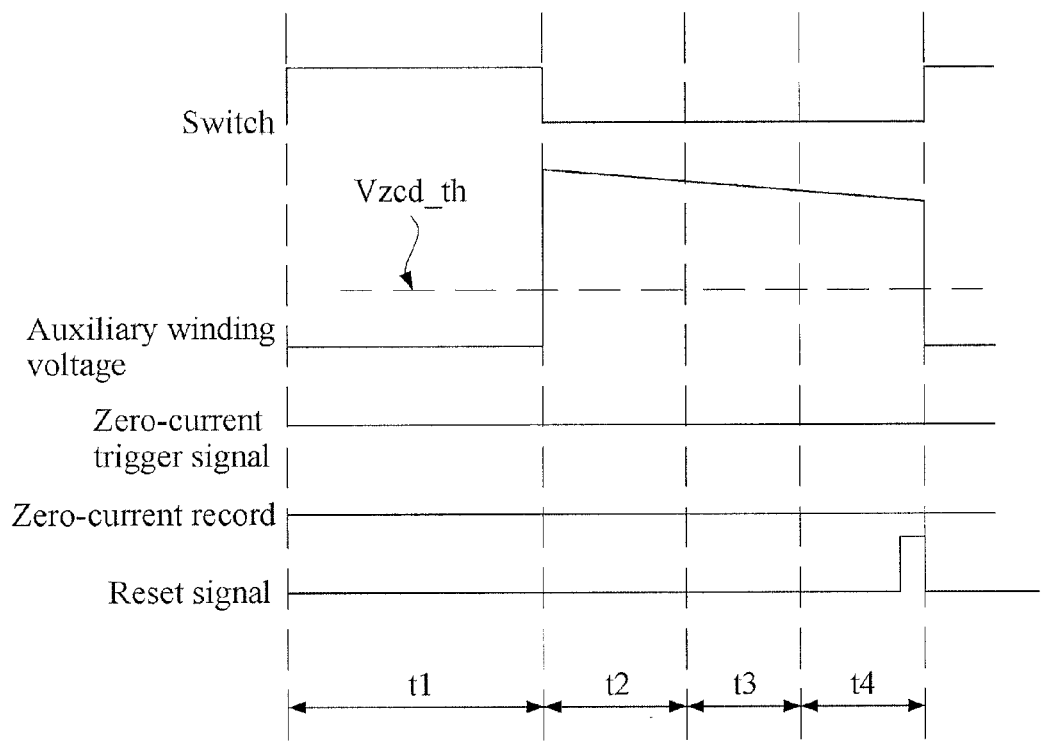
FIG. 7 is a schematic waveform plot of the preferred power control system of FIG. 1 applied to a continuous conduction mode.

Referring now to FIG. 7, a schematic waveform plot of the preferred power control system of FIG. 1 applied to a continuous conduction mode is illustrated. As shown, FIG. 7 is resembled to FIG. 6 for the light-duty fixed-frequency mode. In FIG. 7, if the situation of dropping the auxiliary winding voltage to zero from a voltage larger than the detected threshold voltage Vzcd_th is not detected in either the second status interval or the third status interval so that the fourth counting time t4 is the same as the fourth time interval corresponding to the fourth status interval, then the status control unit 13 is directly triggered to reset the timer 11, and the driver unit 14 is triggered to open the switch 23 so as to re-enter the first status interval.

As described above, in any of the boundary conduction mode, the non-continuous conduction mode and the light-duty fixed-frequency mode, the situation of dropping the auxiliary winding voltage to zero from a voltage larger than the detected threshold voltage Vzcd_th is commonly used to determine the opening of the switch 23 at the trough of the corresponding waveform. The only differences are the delay of the triggering and the management at the situation that the dropping of the auxiliary winding voltage to zero from a voltage larger than the detected threshold voltage Vzcd_th is not detected. In the present invention, if the oscillation intensity of the auxiliary winding voltage is remarkable (for example, larger than the detected threshold voltage Vzcd_th plotted in FIG. 4 to FIG. 6), then the switch 23 is immediately opened as long as the zero current is detected in either the third status interval or the fourth status interval. Or, while the situation of dropping the auxiliary winding voltage to zero from a voltage larger than the detected threshold voltage Vzcd_th is detected in the second status interval, then the zero-current occurrence event is recorded, and the switch 23 is triggered to directly open at the end of the third status interval. Hence, a user can simply control the length of each individual time interval corresponding to the specific status interval, and then he/she can switch easily to a preferred operation of the power control system.

In the present invention, the power control system can control the operating frequency as well. For example, in the boundary conduction mode (BCM/CrM), the period is the sum of the first counting time and a natural discharge time of the coil module (tzcd). The natural discharge time of the coil module 22 is smaller than the sum of the second counting time, the third counting time and the fourth counting time. Hence, when the load is decreased, the second counting time can be selectively controlled to increase (as shown in FIG. 3). In the fixed-frequency mode, the period is the sum of the first counting time to the fourth counting time. While in an extreme light duty, the second counting time is far larger than the sum of the first counting time, the third counting time and the fourth counting time. Hence, the ratio of the period to the frequency is about equal to the second counting time.

In addition, in the heavy duty, the first counting time is increased, the second counting time is dropped to almost zero, and the fourth counting time is decreased as well. When any of the aforesaid counting times is larger than the sum of the second counting time, the third counting time and the fourth counting time, then the system is in the continuous conduction mode. Thus, simply based on the curves of FIG. 3, the operating frequency of each interval can be selectively controlled.

It shall be noted that the preferred system of the present invention introduces the second status interval to limit the highest switching frequency, so as to avoid an excessive high switching frequency in the situation of a too short open time of the switch 23 and a too short zero-current time. Thereupon, the switch loss can be reduced. The inclusion of the fourth status interval is to overcome the situation that the auxiliary winding voltage is too low to affect the detection of the zero-current trigger unit 12 and the zero-current recording unit 16 of the power control system 1 while an unexpected short open time of the switch 23 in the light-duty status is met. Hence, through arranging properly the second status interval, the third status interval and the fourth state interval, the switch 23 can be forced to open at the end of the fourth status interval.

In addition, when the system is operated under a medium load, the auxiliary winding voltage is usually detectable to the power control system 1. Thus, the fourth status interval is negligible. In the heavy-duty status as shown in FIG. 3, as the load voltage rises to a level, the fourth status interval can be set so as to have the sum of the second counting time, the third counting time and the fourth counting time to be smaller than the previous sum of the second counting time, the third counting time and the fourth counting time. Then, even the zero-current status is not met, the switch 23 can be still opened at the end of the fourth status interval, and then the system is switched from the boundary conduction mode to the continuous conduction mode.

Figure 8:
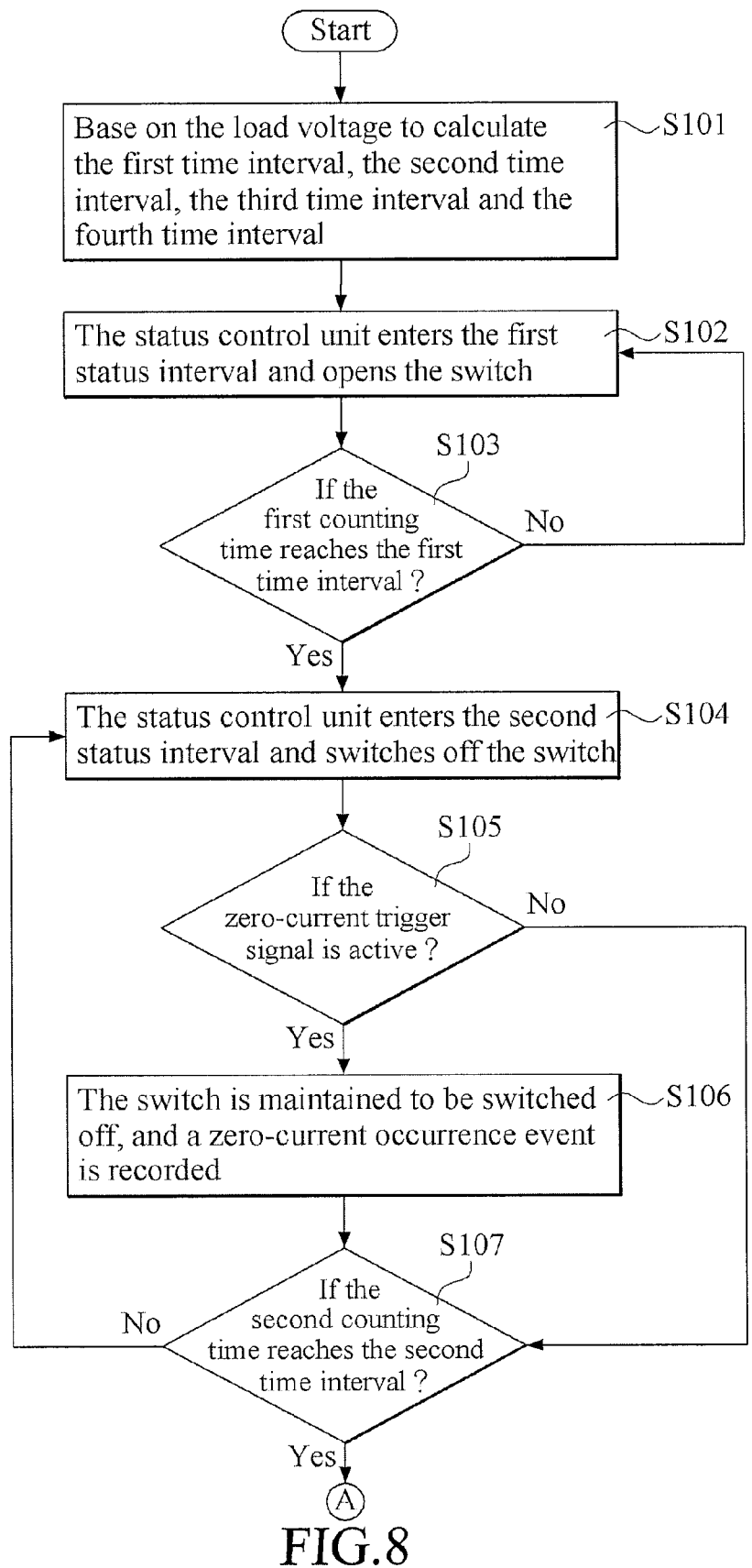
FIG. 8 and FIG. 8A are integrally to show a flowchart of a preferred power control method in accordance with the present invention.
Figure 8A:
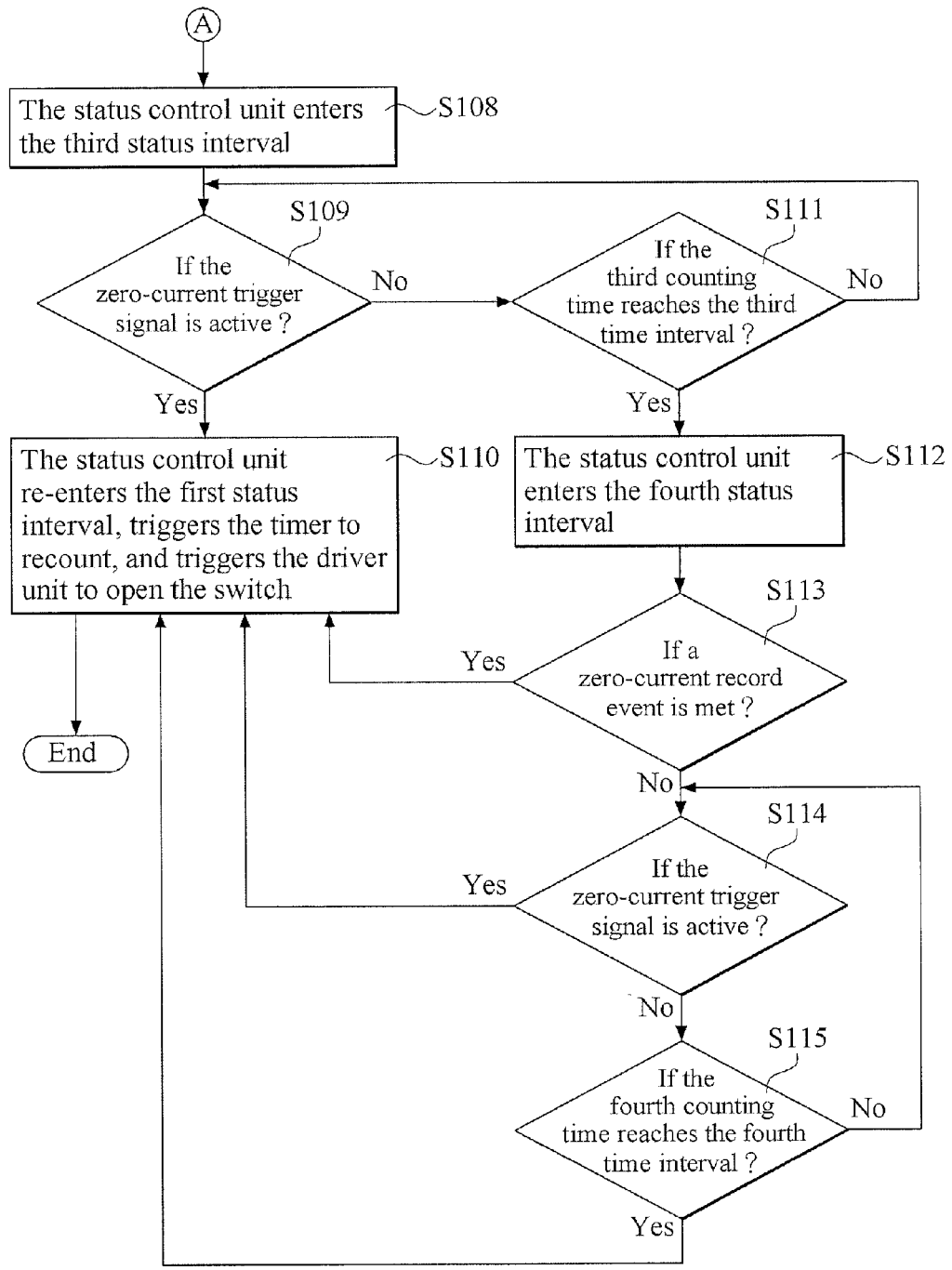

Refer now from FIG. 1 through FIG. 8A, where FIG. 8 and FIG. 8A are integrally to show a flowchart of a preferred power control method in accordance with the present invention. As shown, the power control method includes the following steps.

Step S101: Base on the load voltage to calculate the first time interval, the second time interval, the third time interval and the fourth time interval.

Step S102: The status control unit 13 enters the first status interval and opens the switch 23.

Step S103: Determine whether or not the first counting time t1 reaches the first time interval.

Step S104: The status control unit 13 enters the second status interval and switches off the switch 23;

Step S105: Determine whether or not the auxiliary winding voltage drops to zero from a voltage larger than the positive detected threshold voltage; such that a corresponding zero-current trigger signal of the zero-current trigger unit 12 is active.

Step S106: The switch 23 is maintained to be switched off, and a zero-current occurrence event is recorded.

Step S107: Determine whether or not the second counting time t2 reaches the second time interval.

Step S108: The status control unit 13 enters the third status interval.

Step S109: Determine whether or not the zero-current trigger signal is active.

Step S110: The status control unit 13 re-enters the first status interval, triggers the timer 11 to recount, and triggers the driver unit 14 to open the switch 23.

Step S111: Determine whether or not the third counting time t3 reaches the third time interval.

Step S112: The status control unit 13 enters the fourth status interval.

Step S113: Determine whether or not a zero-current record event is met.

Step S114: Determine whether or not the zero-current trigger signal is active.

Step S115: Determine whether or not the fourth counting time t4 reaches the fourth time interval.

In this embodiment, if the judgment in any of the aforesaid step S109, step S113, step S114 and step S115 is positive, then step S110 is performed to re-open the switch 23. In other embodiments, step S105 and step S106 can be skipped, and step S107 is performed directly. However, all the other steps are still prevailed in these embodiments, and thus details thereabout are omitted herein. In addition, in step S113, the zero-current record event is corresponding to the zero-current occurrence event in step S106, or to an instant zero-current occurrence event in the fourth status interval.

Accordingly, by providing the power control system and the power control method of the present invention, since the four status intervals are introduced so as to have the system and the method applicable to various operation modes, thus the preferred operation mode can be determined and selected according to the practical load status. Thereupon, the conventional shortcomings in the high input peak current, the high frequency switch loss, the entrance of the low-frequency intermittent burst mode, the bias in current waveform, the occurrence of audio noise while in entering an audio frequency and so on, can be effectively resolved.

While the present invention has been particularly shown and described with reference to a preferred embodiment, it will be understood by those skilled in the art that various changes in form and detail may be without departing from the spirit and scope of the present invention.

What is claimed is:

1. A power control system, electrically connected to a power function circuit having a power circuit, a coil module, a switch and a load circuit, the coil module being electrically connected to the power circuit, the switch being electrically connected to the coil module, the load circuit being electrically connected to the coil module, the power circuit being to provide a supply voltage for having a detection coil of the coil module to generate an auxiliary winding voltage, the power control system comprising:
- at least one timer, being to count a first counting time, a second counting time, a third counting time and a fourth counting time;
- a zero-current trigger unit, electrically connected to the coil module, being to transmit a zero-current trigger signal upon when the auxiliary winding voltage drops to zero from a voltage larger than a positive detected threshold voltage;
- a status control unit, electrically connected to the timer and the zero-current trigger unit, having a first status interval, a second status interval, a third status interval and a fourth status interval, the first status interval being corresponding to a first time interval, the second status interval being corresponding to a second time interval, the third status interval being corresponding to a third time interval, the fourth status interval being corresponding to a fourth time interval, a switching-on interval of the switch being defined to the first status interval, a switching-off interval of the switch being divided to define the second status interval, the third status interval and the fourth status interval;
- a driver unit, electrically connected to the status control unit and the switch; and
- a zero-current recording unit, electrically connected to the zero-current trigger unit, being to record a zero-current occurrence event upon when the zero-current trigger unit transmits the zero-current trigger signal;
- wherein, initially when the status control unit enters the first status interval, the timer begins to count the first counting time; when the first counting time reaches the first time interval, the status control unit enters the second status interval, and the timer counts the second counting time; when the second counting time reaches the second time interval, the status control unit enters the third status interval, and the timer counts the third counting time; when the third counting time reaches the third time interval, the status control unit enters the fourth status interval, and the timer counts the fourth counting time; and, when the fourth counting time reaches the fourth time interval, the status control unit re-enters the first status interval and triggers the timer to recount;
- wherein, when the status control unit in one of the third status interval and the fourth status interval receives the zero-current trigger signal, the first status interval is re-entered, the timer is triggered to recount, and the driver unit is triggered to open the switch.

2. The power control system of claim 1, further including an arithmetic unit, electrically connected to the load circuit and the status control unit, the supply voltage generating a load voltage in the load circuit, the arithmetic unit basing on the load voltage to calculate the first time interval, the second time interval, the third time interval and the fourth time interval.

3. The power control system of claim 1, wherein, when the status control unit is in the second status interval, the switch is maintained to be switched off.

4. The power control system of claim 1, wherein, when the fourth counting time reaches the fourth time interval and the auxiliary winding voltage is not zero, the status control unit re-enters the first status interval and triggers the timer to recount.

5. A power control method, applicable to the power control system of claim 1, the power control method comprising the steps of:
- (a) determining whether or not the first counting time reaches the first time interval;
- (b) if a judgment of the step (a) is positive, then the status control unit entering the second status interval;
- (c) determining whether or not the second counting time reaches the second time interval;
- (d) if a judgment of the step (c) is positive, then the status control unit entering the third status interval;
- (e) determining whether or not a zero-current trigger signal of the zero-current trigger unit is active;
- (f) if a judgment of the step (e) is positive, then the status control unit re-entering the first status interval, triggering the timer to recount, and triggering the driver unit to open the switch;
- (g) if the judgment of the step (e) is negative, then determining further whether or not the third counting time reaches the third time interval;
- (h) if a judgment of the step (g) is positive, then the status control unit entering the fourth status interval;
- (i) determining whether or not the zero-current trigger signal is active;
- (j) if a judgment of the step (i) is positive, then the status control unit re-entering the first status interval, triggering the timer to recount, and triggering the driver unit to open the switch;
- (k) if the judgment of the step (i) is negative, determining further whether or not the fourth counting time reaches the fourth time interval; and
- (l) if a judgment of the step (k) is positive, then the status control unit re-entering the first status interval, triggering the timer to recount, and triggering the driver unit to open the switch.

6. The power control method of claim 5, wherein the supply voltage generates a load voltage in the load circuit; wherein, prior to the step (a), the power control method further includes a step (a0) of basing on the load voltage to calculate the first time interval, the second time interval, the third time interval and the fourth time interval.

7. The power control method of claim 5, between the step (b) and the step (c), further including the steps of:
- (b0) determining whether or not the zero-current trigger signal is active; and
- (b1) if a judgment of the step (b0) is positive, then the switch being maintained to be switched off, and a zero-current occurrence event being recorded.

* * * * *